United States Patent [19]

Wilkens

[11] 3,754,188

[45] Aug. 21, 1973

[54] REDUNDANT FM TRANSMITTING SYSTEM

[75] Inventor: Mark W. Wilkens, Palo Alto, Calif.

[73] Assignee: Farinon Electric, San Carlos, Calif.

[22] Filed: Apr. 16, 1971

[21] Appl. No.: 134,814

[52] U.S. Cl. .................... 325/56, 325/158, 325/57, 325/2

[51] Int. Cl. .................... H04b 7/00

[58] Field of Search .................... 325/2, 51, 56, 57, 325/58, 184, 187, 144–148, 145, 156, 157, 158

[56] References Cited

UNITED STATES PATENTS

| | | | |
|---|---|---|---|
| 3,517,317 | 6/1970 | Sire | 325/158 |
| 2,905,813 | 9/1959 | Probze | 325/158 |
| 2,505,266 | 4/1950 | Villem | 325/56 |
| 3,363,181 | 1/1968 | Haywood et al. | 325/158 |

*Primary Examiner*—Robert L. Griffin
*Assistant Examiner*—William T. Ellis
*Attorney*—Flehr, Hohback, Test, Albritton & Herbert

[57] ABSTRACT

A redundant FM or PM transmitting system in which two transmitters operating at the same carrier frequency are modulated by a common baseband input and the RF outputs are combined and applied to the antenna. A sample of the RF output from each of the transmitters is applied to a phase detector which develops a signal having a component representative of the phase differences in the carrier. The signal is used to phase lock the second transmitter to the first whereby the output of the transmitters can be combined without objectionable intermodulation distortion.

6 Claims, 2 Drawing Figures

MARK W. WILKENS
INVENTOR.

BY Flehr, Hohbach, Test, Albritton and Herbert
ATTORNEYS

MARK W. WILKENS
INVENTOR

BY Flehr, Hohbach, Test, Albritton and Herbert
ATTORNEYS

REDUNDANT FM TRANSMITTING SYSTEM

BACKGROUND OF THE INVENTION

This invention relates generally to a redundant transmitting system and more particularly to such a system wherein the outputs of two frequency or phase modulated transmitters are combined for transmission.

In the normal protected transmitting system, one transmitter acts as a standby and is connected to the antenna only when the first transmitter fails. Generally, the transfer from one transmitter to the other is performed by diode switches. There is a momentary interruption during switching which can cause transmission errors. In such systems, it is also possible to switch to a faulty standby transmitter.

A proposed transmitting system was one in which the transmitters were locked by injecting a sample from one transmitter into the other. This arrangement has a disadvantage in that it requires a high degree of stability in the phase shift between the transmitters and the combining point.

OBJECTS AND SUMMARY OF THE INVENTION

It is an object of the present invention to provide an improved redundant transmitting system.

It is another object of the present invention to provide a redundant transmitting system in which the outputs of the two transmitters are added to give an output signal at a power level approximately equal to the sum of the two inputs.

It is a further object of the present invention to provide a redundant transmitting system in which the RF signal path of the combining circuits are passive.

It is a further object of the present invention to provide a redundant transmitting system in which transmission is continuous even when one transmitter fails.

It is a further object of the present invention to provide a redundant transmitting system in which the condition of both transmitters is always known and the possibility of switching to a faulty transmitter is eliminated.

The foregoing and other objects of the invention are achieved by a redundant transmitting system in which first and second transmitters operate at a common carrier frequency with one transmitter being frequency controlled. Each of the transmitters is modulated by the same baseband frequency and combining means combines the output of the transmitters. Sampling means serve to sample the signals applied to the combiner. A phase detector receives the sampled signals and generates a control signal which is proportional to the phase difference between the transmitter carrier frequencies. The control signal is applied to the second transmitter for controlling the phase and frequency of the second transmitter. The outputs of the two transmitters can be combined without excess intermodulation distortion.

DESCRIPTION OF THE PREFERRED EMBODIMENTS

Figure 1:
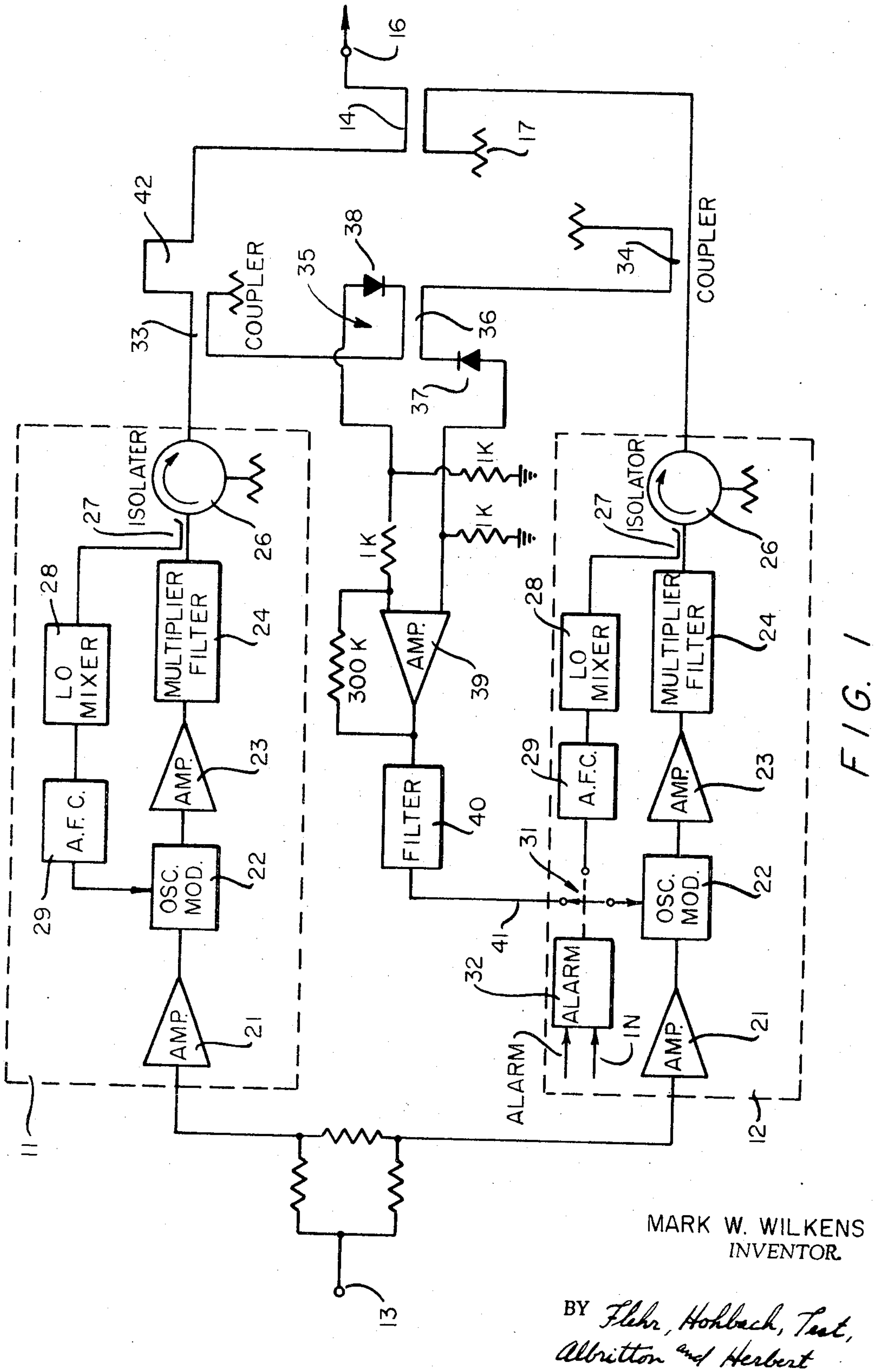
FIG. 1 is a schematic block diagram of a redundant FM transmitting system in accordance with the present invention.

Referring to FIG. 1, FM transmitters 11 and 12 are modulated by a common baseband input 13. The outputs from the FM transmitters are applied to a combiner 14 and thence to an antenna (not shown) connected to the output terminal 16. A suitable combiner is an ESCA 3 db hybrid Model 66021–105 terminated by termination 17 such as an Aviel Mod. AVLZ–365 termination. The transmitters 11 and 12 may be any conventional frequency stabilized transmitter as, for example, a Farinon SS2000W transmitter. The transmitters include a broad band amplifier 21 which amplifies the input baseband signals and applies the same to modulate the oscillator 22. The output of the oscillator is amplified by amplifier 23, applied to multiplier-filter 24 and thence applied to an isolator 26 which isolates the transmitter from the output. The carrier frequency of each transmitter is stabilized by sampling the output of the multiplier-filter 24 with a coupler 27 and applying the same to a mixer 28 which mixes the sampled signal with a local oscillator signal and applies the difference to an AFC circuit 29 which generates a signal to control the oscillator to control the carrier frequency.

The transmitter 12 includes a switch means, illustrated as a mechanical switch 31, which serves to disconnect the frequency stabilizing circuit during normal operation. The switch 31 is operated by alarm circuit 32 to connect the frequency control loop when transmitter 11 fails and transmitter 12 provides the total power output. The frequency of transmitter 12 is normally controlled by a phase lock signal derived from both transmitters, as will be presently described.

In accordance with the present invention, a small sample of the output of each transmitter is applied to a phase detector 35 which generates a low frequency voltage with a d.c. component proportional to the difference in phase between the output carrier of the two transmitters. The output signal from each of the transmitters is sampled by couplers 33 and 34, respectively. These couplers may, for example, be 30 db directional couplers sold by Microlab, Model CB59N. The output of the couplers is applied to phase detector 35 which comprises a hybrid circuit 36, for example, an ESCA 3 db hybrid Mod. 66021–105. Associated with the couplers are diode detectors 37 and 38 which may be Model HP420A detectors sold by Hewlett-Packard Company. The output of the phase detector is applied to an amplifier 39 with resistive loads as shown. The amplifier 39 may, for example, be an integrated circuit amplifier, such as Fairchild A739. The output of the amplifier is applied to a low pass filter 40 which may consist of a resistive-capacitive low pass filter to stabilize the loop response. The d.c. signal appearing on the line 41 is used to control the oscillator-modulator 22 whereby the carrier of the transmitter 12 is phase-locked to the carrier of the transmitter 11. The output circuit connected to transmitter 11 includes an added length of coaxial line 42 to provide correction of fixed phase shifts introduced by the couplers, unequal line lengths, etc.

By maintaining phase alignment of the carrier frequencies, it is possible to combine the two transmitter outputs even when the output signals are modulated. At low modulation frequencies, phase alignment is maintained by the phaselocked loop; at higher frequencies, alignment depends on equal modulation of the transmitters. The required bandwidth of the phaselocked loop is determined by the noise spectrum of the unmodulated oscillator which is to be controlled, that is, by the range of frequencies over which the oscillator power is distributed. For instance, a noisy oscillator would have a broad spectrum, corresponding to large random variations from the average carrier frequency, and the bandwidth of the phaselocked loop would have to be wide enough to follow these variations in order to lock the oscillator to the reference oscillator. It is fortunate, however, that for most oscillators used in communication systems, the spectrum is relatively narrow and loop stability requirements are easily met. It is also important that the transmitters have substantially equal modulation characteristics whereby the baseband frequency modulates each of the transmitters to substantially the same degree. The degree of RF phase alignment at higher modulating frequencies is determined by the difference in the baseband gain, frequency response and deviation sensitivity of the two transmitters. The phaselocked loop has no effect at these frequencies since it is operating at relatively lower frequencies.

Clearly, if the two transmitters are locked exactly in phase at low modulating frequencies and if they are also modulated to exactly the same degree and at the same rate at high frequencies, the spectrum will be identical and they can be combined. In practice, it is reasonable to hold the modulation differences to within 0.5 db. It has been found that the combiner can tolerate misalignment of about 1 to 2 db before intermodulation distortion increases objectionably with the degree of deviation which is commonly used in FM transmitting systems.

In a typical example, the baseband input has a noise load equivalent to a 300 channel voice multiplex signal. The frequency range extended from 60 kHz to 1,300 kHz; the deviation per voice channel was 200 kHz RMS, and the total occupied bandwidth was 4.7 MHz. These levels, frequencies and test methods employed are established by an international agency (International Radio Consultative Committee). The redundant transmitting system described was tested in accordance with the foregoing and it was found that with perfect modulation level adjustment the intermodulation level was approximately the average of the values measured for the transmitters individually. The modulation could be misadjusted over a range of 2 db before the intermodulation products increased by 3 db.

It will be apparent to one skilled in the art that the invention can also be applied to phase modulated transmitting systems in which two transmitters operating at the same carrier frequencies are modulated by a common baseband input and the RF outputs are combined and applied to an antenna.

Figure 2:
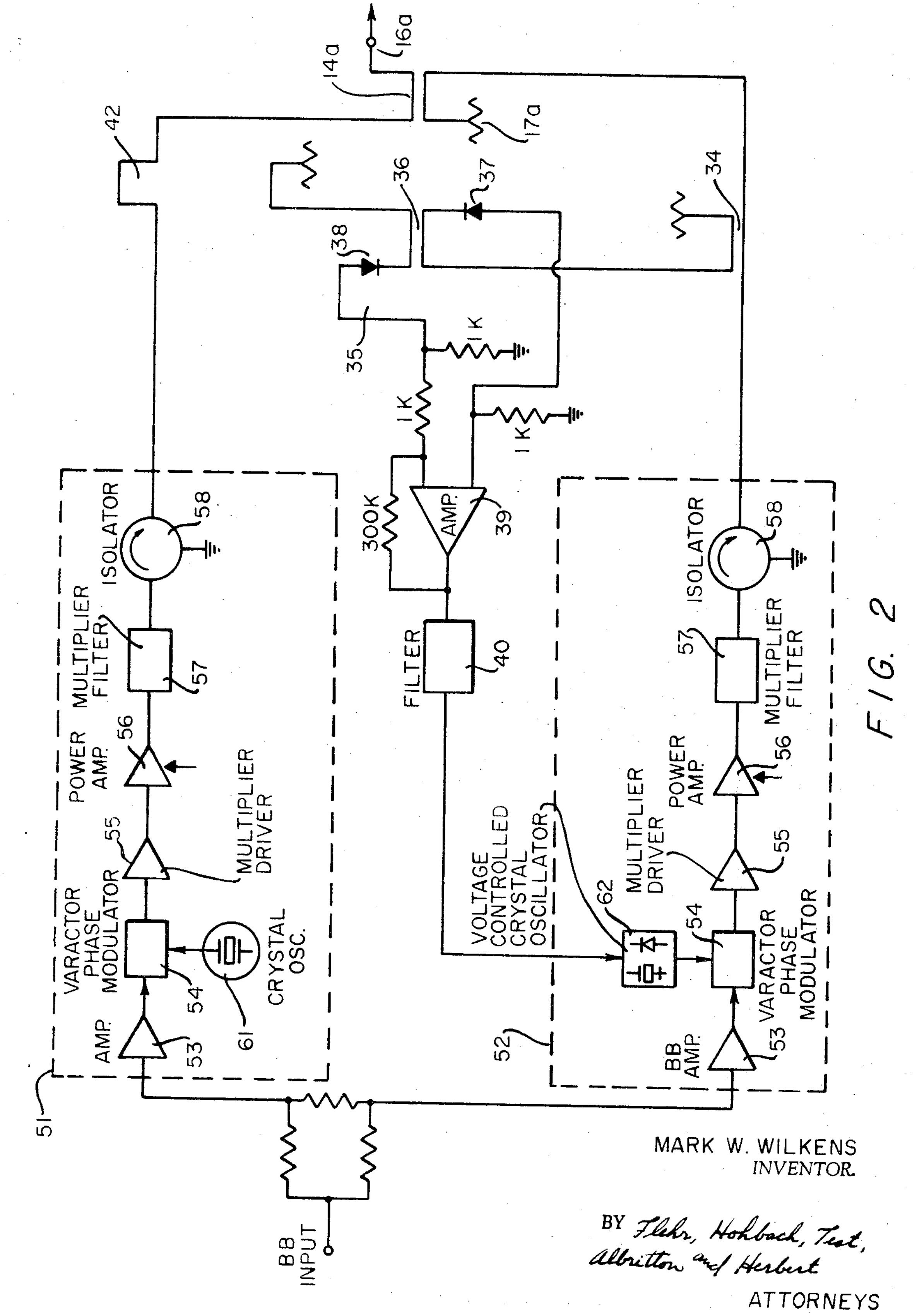
FIG. 2 is a schematic block diagram of a redundant PM transmitting system in accordance with the present invention.

Referring to FIG. 2, a phase modulated transmitting system incorporating the present invention is shown in schematic block diagram. The transmitting system includes a first transmitter 51 which is the frequency controlled transmitter and a second transmitter 52 whose outputs are fed to the combiner 14*a* and thence to the output 16*a*. Each of the transmitters includes an input amplifier 53, a varactor phase modulator 54, multiplier-driver 55, keyed power amplifiers 56, multiplier-filters 57 and isolators 58. A crystal controlled oscillator 61 provides the carrier frequency for the transmitter 51. A voltage controlled crystal oscillator 62 provides the carrier for the transmitter 52. The frequency of the voltage controlled crystal oscillator 62 is controlled by a voltage from a phase detector means. The circuit derives an output d.c. voltage which is applied to voltage controlled oscillator 62 to control its phase so that the phase of the oscillators 61 and 62 are maintained. The circuit for deriving the control voltage is identical to the one previously described and like reference numerals are applied to like parts. The same advantages as previously described are achieved by maintaining the phase alignment of the carrier frequencies in the PM transmitter whereby to permit the combining of the two transmitter outputs even when the output signals are modulated.

In the event of failure of the transmitter 51, the output of the phase detector drops to zero and the voltage controlled crystal oscillator then oscillates at a frequency determined solely by the crystal. Preferably, the alarm signal also serves to key off the amplifier 56 of the channel which is not operating.

Thus, there has been provided a redundant FM transmitting system in which the phaselocked loop has a relatively low signal bandwidth with a much greater bandwidth of the transmitted signal, in the order of 10,000 or more times the bandwidth of the phase lock loop bandwidth. The system permits use of conventional FM transmitters with a low frequency phase loop. The system eliminates certain switching transients, gives greater power, almost twice the power of the output of either transmitter, increases system reliability by eliminating active components, such as diode switches, in the common RF signal path, and eliminates the possibility of switching to a faulty transmitter.

I claim:

1. A transmitting system comprising first and second transmitters each having its own oscillator for generating its carrier frequency, means for applying a baseband frequency to each of said transmitters whereby the output of each is modulated in accordance therewith, combining means for combining the modulated output of said transmitters, sampling means for sampling each of the signals applied to the combiner, phase detector means connected to said sampling means and serving to generate a control signal proportional to the phase difference between said sampled signals, and means responsive to said control signal for controlling the frequency of the oscillator of the second transmitter whereby the frequency of the second transmitter's oscillator is locked to the frequency of the first transmitter's oscillator.

2. A transmitting system as in claim 1 wherein said transmitters are frequency modulated by the baseband frequency.

3. A transmitting system as in claim 1 wherein said transmitters are phase modulated by the baseband frequency.

4. A transmitting system comprising first and second FM transmitters each having its own oscillator for generating its carrier frequency, at least said first transmitter including frequency control means for controlling the oscillator frequency, means for applying a baseband frequency to said transmitters whereby each frequency is modulated in accordance therewith, combining means for combining the modulated output of said transmitters, sampling means for sampling each of the signals applied to the combiner, phase detector means connected to said sampling means and serving to generate a control signal proportional to the phase difference between said sampled signals, and means responsive to said control signal for controlling the frequency of the oscillator of the second transmitter whereby the frequency of the second transmitter's oscillator is locked to the frequency of the first transmitter's oscillator.

5. A redundant FM transmitting system comprising first and second FM transmitters each having its own oscillator for generating its carrier frequency, each of said transmitters including frequency control means for controlling the oscillator frequency, means normally disconnecting the frequency control means of said second transmitter, means for applying a baseband frequency to said transmitters whereby each is modulated in accordance therewith, combining means for combining the FM output of said transmitters, sampling each of means for sampling the signals applied to the combiner, phase detector means connected to said sampling means and serving to generate a control signal proportional to the phase difference between said sampled signals, and means responsive to said control signal for controlling the frequency of the oscillator of the second transmitter whereby the frequency of the second transmitter's oscillator is locked to the frequency of the first transmitter's oscillator.

6. A redundant FM transmitting system as in claim 5 including alarm means for operating said means normally disconnecting the frequency control means of said second transmitter to connect said frequency control means to said second transmitter, said alarm means connected to receive a signal generated within said first transmitter indicating failure of said first transmitter whereby the second transmitter independently provides an output signal during failure of the first transmitter.

* * * * *